United States Patent
Knoche et al.

(10) Patent No.: US 10,184,655 B2
(45) Date of Patent: *Jan. 22, 2019

(54) DISPLAY DEVICE

(75) Inventors: Silke Knoche, Saulheim (DE);
Matthias Bockmeyer, Mainz (DE);
Andrea Anton, Hueffelsheim (DE);
Thomas Zenker, Nieder-Olm (DE);
Gerold Ohl, Sulzheim (DE)

(73) Assignee: SCHOTT AG, Mainz (DE)

(*) Notice: Subject to any disclaimer, the term of this patent is extended or adjusted under 35 U.S.C. 154(b) by 592 days.

This patent is subject to a terminal disclaimer.

(21) Appl. No.: 14/119,880

(22) PCT Filed: May 4, 2012

(86) PCT No.: PCT/EP2012/058199
§ 371 (c)(1),
(2), (4) Date: Jan. 23, 2014

(87) PCT Pub. No.: WO2012/168011
PCT Pub. Date: Dec. 13, 2012

(65) Prior Publication Data
US 2014/0153234 A1    Jun. 5, 2014

(30) Foreign Application Priority Data

Jun. 6, 2011   (DE) .................... 10 2011 050 870

(51) Int. Cl.
*F21V 33/00*   (2006.01)
*F21V 9/40*    (2018.01)
(Continued)

(52) U.S. Cl.
CPC ............ *F21V 33/0044* (2013.01); *F21K 9/64* (2016.08); *F21V 9/40* (2018.02); *F24C 7/082* (2013.01);
(Continued)

(58) Field of Classification Search
CPC .......... F21K 9/56; F21V 33/0044; F21V 9/10; F21W 2131/403; F24C 15/102; F24C 7/082
See application file for complete search history.

(56) References Cited

U.S. PATENT DOCUMENTS

| 5,491,115 A | 2/1996 | Pfitzenmaier |
| 5,667,888 A * | 9/1997 | Yoshida ................ C03C 17/009 106/287.1 |

(Continued)

FOREIGN PATENT DOCUMENTS

| DE | 3814354 | 11/1989 |
| DE | 4007971 | 9/1991 |

(Continued)

OTHER PUBLICATIONS

International Search Report dated Oct. 16, 2012 corresponding to PCT/EP2012/05199, 5 pp.

(Continued)

*Primary Examiner* — Anh Mai
*Assistant Examiner* — Zachary J Snyder
(74) *Attorney, Agent, or Firm* — Ohlandt, Greeley, Ruggiero & Perle, L.L.P.

(57) ABSTRACT

A display device is provided that is a transparent, colored glass-ceramic with a display face on the front, an illumination face on the back, and at least one light-emitting element being disposed in the region of the illumination face. The display device further includes a color compensation filter in the form of a color layer introduced directly or indirectly on the glass ceramics.

48 Claims, 5 Drawing Sheets

(51) Int. Cl.

| | | |
|---|---|---|
| F24C 7/08 | (2006.01) | |
| G02B 5/22 | (2006.01) | |
| G09F 9/33 | (2006.01) | |
| H05B 3/74 | (2006.01) | |
| H05B 6/12 | (2006.01) | |
| F21K 9/64 | (2016.01) | |
| F24C 15/10 | (2006.01) | |

(52) U.S. Cl.
CPC .............. *F24C 7/083* (2013.01); *G02B 5/223* (2013.01); *G02B 5/226* (2013.01); *G09F 9/33* (2013.01); *H05B 3/746* (2013.01); *H05B 6/1218* (2013.01); *F24C 15/102* (2013.01)

(56) References Cited

U.S. PATENT DOCUMENTS

| | | | |
|---|---|---|---|
| 5,902,032 | A | 5/1999 | Hannigan |
| 5,963,280 | A | 10/1999 | Okuda |
| 6,369,365 | B1 | 4/2002 | Nass et al. |
| 7,718,929 | B2* | 5/2010 | Shimatani ............... C03C 17/06 219/443.1 |
| 2002/0159261 | A1 | 10/2002 | Hildenbrand |
| 2005/0252754 | A1 | 11/2005 | Arnold |
| 2006/0081773 | A1 | 4/2006 | Rains, Jr. |
| 2007/0108181 | A1 | 5/2007 | Gassmann et al. |
| 2007/0108184 | A1* | 5/2007 | Imamoto ............. H05B 6/1218 219/441 |
| 2007/0295711 | A1 | 12/2007 | Striegler |
| 2008/0180016 | A1 | 7/2008 | Oishi |
| 2008/0207424 | A1 | 8/2008 | Aitken |
| 2008/0297905 | A1* | 12/2008 | Hwang .................. G02B 1/111 359/589 |
| 2009/0114888 | A1* | 5/2009 | Nishida .................. G02B 5/201 252/586 |
| 2009/0122240 | A1* | 5/2009 | Lim .................. G02F 1/133512 349/106 |
| 2009/0231523 | A1* | 9/2009 | Matsumoto ............ G02B 5/223 349/110 |
| 2010/0193496 | A1* | 8/2010 | Jung ...................... F24C 7/082 219/209 |
| 2010/0219176 | A1 | 9/2010 | Striegler |
| 2010/0304948 | A1 | 12/2010 | Comte |
| 2011/0051412 | A1 | 3/2011 | Jeong |
| 2011/0226231 | A1 | 9/2011 | Siebers |
| 2012/0067865 | A1 | 3/2012 | Siebers |
| 2015/0239771 | A1 | 8/2015 | Siebers |

FOREIGN PATENT DOCUMENTS

| | | |
|---|---|---|
| DE | 10052370.6 A1 | 5/2002 |
| DE | 10309225 A1 | 9/2004 |
| DE | 102008012602 A1 | 9/2009 |
| DE | 102008050263 | 4/2010 |
| DE | 102009012952 | 9/2010 |
| DE | 102009013127.2 A1 | 9/2010 |
| DE | 202010014361 A1 | 12/2010 |
| DE | 102010061123.9 A1 | 6/2012 |
| EP | 0317022 | 5/1989 |
| EP | 1429366 A1 | 6/2004 |
| EP | 1867613 | 12/2007 |
| EP | 2048781 A1 | 4/2009 |
| JP | 2005093209 A1 | 4/2005 |
| WO | 2008104563 | 9/2008 |
| WO | 2010040443 | 4/2010 |
| WO | 2010137000 | 12/2010 |
| WO | 2011144747 | 11/2011 |

OTHER PUBLICATIONS

Driscoll, Walter G., et al., "Handbook of Optics", Jan. 1, 1978, McGraw-Hill, USA., 22 pp.

English Translation of International Search Report dated Feb. 22, 2012 corresponding to International Patent Application No. PCT/EP2011/071631, 3 pages.

English Translation of the Written Opinion of the International Search Authority dated Feb. 22, 2012 corresponding International Patent Application No. PCT/EP2011/071631, 6 pages.

English Translation of the International Preliminary Report on Patentability dated Jun. 12, 2013 corresponding to International Patent Application No. PCT/EP2011/071631, 7 pages.

English Translation of the International search report from corresponding International Application No. PCT/EP2012/058200 dated Nov. 13, 2012, 3 pages.

English Translation of the Written Opinion of the International Search Authority from corresponding International Application No. PCT/EP2012/058200 dated Nov. 13, 2012, 11 pages.

English Translation of the International Preliminary Report on Patentability from corresponding International Application No. PCT/EP2012/058200 dated Dec. 10, 2013, 12 pages.

English Translation of the Written Opinion of the International Search Authority dated Oct. 16, 2012 corresponding PCT/EP2012/005199, 5 pages.

English Translation of the International Preliminary Report on Patentability dated Jun. 24, 2014 corresponding to PCT/EP2012/005199, 6 pages.

\* cited by examiner

DISPLAY DEVICE

CROSS REFERENCE TO RELATED APPLICATIONS

This application is a U.S. National Stage Entry under 35 U.S.C. § 371 of PCT/EP2012/058199, filed on May 4, 2012, which claims benefit under 35 U.S.C. § 119(a) of German Patent Application No. 10 2011 050 870.8, filed Jun. 6, 2011, the entire contents of both of which are incorporated herein by reference

BACKGROUND OF THE INVENTION

In order to improve user experience, modern glass-ceramic cooktops are equipped with signal lamps or 7-segment displays. Here, the cooking surface itself is composed of a transparent, colored glass-ceramic panel (substrate), which usually appears black in top view. The signal lamps provide the user with information concerning the ON status of the cooktop or individual cooking zones, the control setting and also whether the cooking zone is still hot after it is turned OFF. LED lamps are usually employed as lighting means.

Based on the coloring of the glass-ceramic cooktop and the very limited selection of colored LED displays, the range of colors that are available for user information is very greatly limited. These displays are by default red or perhaps orange, which is also based on the coloring of the glass-ceramic cooktop. In DE 100 52 370.6, the transmission curve is described for a glass-ceramic cooktop that also permits, in particular, a transmittance for blue light at approximately 450 nm and thus an expanded capability for color display. In DE 10 2009 013 127.2, different display possibilities based on these glass ceramic products are indicated. By broadening the transmission spectrum also to the blue wavelength region, the color possibilities for displays have in fact been expanded, but based on the small number of different-color LED displays, the number of colors visible to the user is also limited in the case of these glass-ceramic cooktops. A white LED, for example, would be perceived by the user as having a clear yellowish tinge due to the transmission curve of the cooktop. In DE 10 2010 061 123.9, it is proposed to avoid this deficiency by the use of RGB-LEDs. An LED lamp is thus composed of three LEDs in the primary colors of red, green and blue. Corresponding to the transmission of the glass-ceramic cooktop, the intensity of the 3 color LEDs is adjusted so that a white color for the light signal is perceived overall by the observer. This technology requires three LEDs and the controls belonging to them. Color shifts may occur over long periods of use due to the different aging of the LEDs of different colors.

SUMMARY

The object of the invention is thus to create an inexpensive and robust display device with transparent, colored glass ceramics, in order to provide any desired and pre-definable color effects for the user.

The object is achieved in a surprisingly simple way by introducing a compensation filter in the form of a color layer—corresponding to the desired perceived color—between the glass-ceramic cooktop and the lighting means. The displacement of the color coordinates of the lighting means is corrected to the desired color coordinates by the filter properties of the glass ceramics by combining the glass ceramics with such a compensation filter.

DETAILED DESCRIPTION

The total transmission of the substrate $\tau_{tot}(\lambda)$ combines the transmission of the glass ceramics $\tau_{gc}(\lambda)$ and that of the compensation filter $\tau_{cf}(\lambda)$ (Eq.1). The intensity distribution $i_{LE}(\lambda)$ of the light-emitting element, which an observer perceives on the display side, is shifted to the intensity distribution $i_d(\lambda)$ of the display via the total transmission spectrum $T_{tot}(\lambda)$ (Eq. 2).

$$\tau_{tot}(\lambda) = \tau_{cf}(\lambda) \cdot \tau_d(\lambda) \quad \text{Eq. 1}$$

$$i_d(\lambda) = \tau_{tot}(\lambda) \cdot i_{LE}(\lambda) \quad \text{Eq. 2}$$

The accompanying shift of the color coordinates can be represented in the CIE standard colorimetric system CIExyY (CIE—Commision internationale de l'éclaireage [International Commision on Illumination]). (For the following description and examples thereof, the CIExyY 1931 version with a 2nd observer will be used in this document.) The human eye is not a spectrally continuous light sensor, but is made up of color receptors for limited red, green and blue spectral regions. Corresponding to this is the sensory perception of the L, M, S cones, with sensitivities in the red, green and blue light spectrum. Based on a test series with test subjects, tristimulus functions $\bar{x}, \bar{y}, \bar{z}$ and the integrals X, Y, Z thereof, which can reproduce the entire color space that our eyes can sense as a triplet of combinations of the artificial primary colors, were defined in the CIE formalism. Here, the $\bar{x}$ and $\bar{z}$ functions correspond only approximately to the L and S cone sensitivities. The $\bar{y}$ function is constructed so that it reproduces the brightness sensitivity in daylight and corresponds roughly to the M cone sensitivity. With Eq. 3 and Eq. 4, the perceived color coordinates are clearly described hereby by the standardized values of x and y; Y is a measure for brightness. The CIExyY formalism describes self-luminators, optionally illuminated through absorbing media, whose light spectrum that falls on the eye is transformed into the standardized X, Y, Z CIE coordinates, which then describe the color coordinates and the brightness of the self-luminator.

$$A = \frac{1}{N} \int \bar{a}(\lambda) \cdot \tau(\lambda) \cdot i(\lambda) \cdot d\lambda \qquad \text{Eq. 3}$$

with $A = X, Y, Z$ and $\bar{a} = \bar{x}, \bar{y}, \bar{z}$ with $N = \int \bar{y}(\lambda) \cdot i(\lambda) \cdot d\lambda$ $$x = \frac{X}{S},\ y = \frac{Y}{S},\ z = 1 - x - y \text{ with } S = X + Y + Z \qquad \text{Eq. 4}$$

Figure 1:
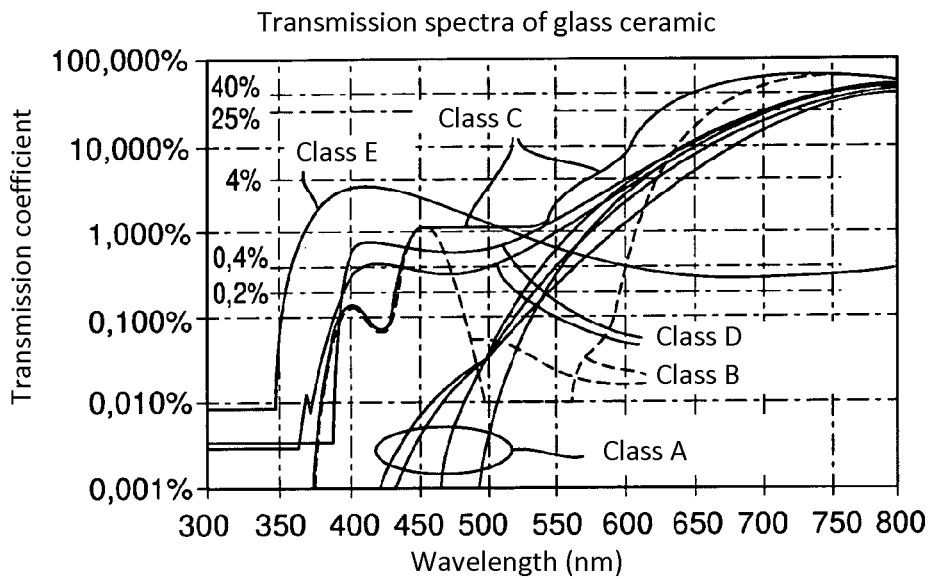
FIG. 1 illustrates typical transmission spectra of different types (classes) of glass ceramics that are usually used for cooking surfaces.

Minimum transmission values of the substrate in the spectral region of all three L, M, S cones or all three $\bar{x},\bar{y},\bar{z}$ CIE primary spectra are a prerequisite for obtaining desired display color coordinates in the red to blue spectral region for an observer by means of a compensation filter and preferably by means of a common commercial, cost-favorable display lighting element. Typical transmission spectra of different types (classes) of glass ceramics that are usually used for cooking surfaces are shown in FIG. 1. The latter involve the glass ceramics of type A colored with vanadium (V), which are the most widely used at the present time (for example, CERAN SUPREMA®, CERAN HIGHTRANS®, KeraBlack®); glass ceramics with coloring by Co, Fe, Ni (type B, for example CERAN COLOR®), with coloring by V, As and Fe (type C, China), with coloring by V, Fe (type D, for example CERAN HIGHTRANS Eco®, and those with coloring by $Ti^{3+}$ by means of reducing refining (for example ZnS refining), type E.

Figure 2:
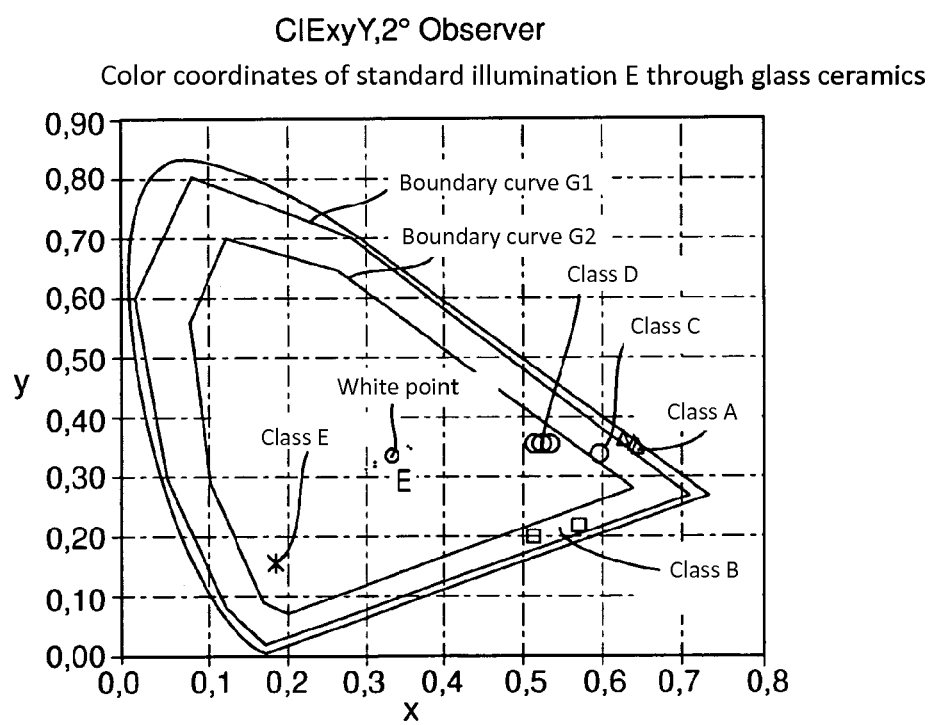
FIG. 2 illustrates the transmission differences in the three spectral sensory regions.

In order to elicit sufficiently bright color effects in the blue to red spectral region with common commercial lighting means (for example, LEDs) through the glass ceramics onto the display face, glass ceramics are necessary that have an average transmission of >0.2%, preferably of >0.4%, for each of the spectral regions of 420-500 nm, 500-620 nm and 550-640 nm. As can be understood from FIG. 1, the newer glass-ceramic classes D and E, and also class C with limitations, fulfill this condition. The current, widely used glass-ceramic class A does not fulfill this condition. Shifts in color coordinates according to the invention over the entire visible spectral region are also impossible with these glass ceramics using conventional lighting means and filters; in particular, there is no white compensation. On the other hand, the spectral transmission must not be too high in order that a view into the internal structure of the cooktop is prevented without employing additional aids, such as light-tight bottom coatings, and so as to present an esthetically preferred, non-transparent cooking surface that is uniform in color. We define this maximum transmission at <40%, preferably <25% at 400 nm and 700 nm, and additionally an average of <4% between 450 and 600 nm. As can be understood from FIG. 1, all of the glass-ceramic classes indicated, except for class C, which appears too transparent in practice, fulfill this second condition of preventing a view into the inner workings of a cooktop. Another, third condition results from the feasibility of a color shift to a white color perception of a commercially available lighting means through a glass-ceramic cooktop and a not-too-complex compensation filter. For this, the transmission differences in the three spectral sensory regions should not be too great. This is shown in FIG. 2. The color coordinates of standard illumination through glass ceramics according to the invention should lie within a boundary curve G1, preferably a boundary curve G2. The corner coordinates of the boundary curves G1 and G2 are listed in Table 2.

If an observer perceives a light stimulus, which is composed of two light signals that lie spatially next to one another but do not appear spatially resolvable by eye, and which are described by the intensity distribution of the light-emitting elements and by filter transmissions, then the perceived sensory stimulus is added linearly (Eq. 5), and the summed-up color coordinates (x, y) in the CIExyY chromaticity diagram lie on a straight line between the color coordinates $(x_1, y_1)$ and $(x_2, y_2)$ of the two light signals (Eq. 6). In the special case of equal intensities (Eq. 7), (x, y) lies in the middle between the color coordinates of the two light signals (Eq. 8).

$$A = \frac{1}{N} \int \bar{a}(\lambda) \cdot (\tau_1(\lambda) \cdot i_1(\lambda) + \tau_2(\lambda) \cdot i_2(\lambda)) \ldots d\lambda = \qquad \text{Eq. 5}$$

$$A_1(\tau_1, k_1 i) + A_1(\tau_2, k_2 i)$$

with $i_1 = k_1 \cdot i,\ i_2 = k_2 \cdot i,\ k_1 + k_2 = 1$ $$x = k_1 x_1 + k_2 x_2 \qquad \text{Eq. 6}$$

with $x_i = f(\tau_i, i), y, z$ correspondingly.

$$k_1 = k_2 = 1/2 \qquad \text{Eq. 7}$$

$$x = \frac{x_1 + x_2}{2},\ y = \frac{y_1 + y_2}{2},\ z = \frac{z_1 + z_2}{2} = 1 - x - y. \qquad \text{Eq. 8}$$

This linear relation is also known from color diagrams, for example, for image displays such as CRT or LCD monitors, in which possibly perceptible color coordinates in the CIExyY diagram lie in a triangle between the color coordinates of the three primary colors of the display device, usually an RGB color space, or in a color polygon with more than three primary colors. Here, the color coordinates are calculated from the linear combination of three or more primary intensities according to (Eq. 6).

In the application according to the invention of two filters disposed one behind the other, of a substrate (for example, glass ceramics) and of a compensation filter, the relation is no longer linear, as is clarified by Eq. 9 in comparison to Eq. 5. In Eq. 9, for $\tau_1$ ($\lambda$) and $\tau_2$ ($\lambda$), for example, from Eq. 1, the transmission spectra of the glass ceramics $\tau_{gc}(\lambda)$ and of the compensation filter $\tau_{cf}(\lambda)$ can be employed.

$$A_{12} = \frac{1}{N} \int \bar{a}(\lambda) \cdot \tau_1(\lambda) \cdot \tau_2(\lambda) \cdot i(\lambda) \ldots d\lambda \qquad \text{Eq. 9}$$

Figure 3:
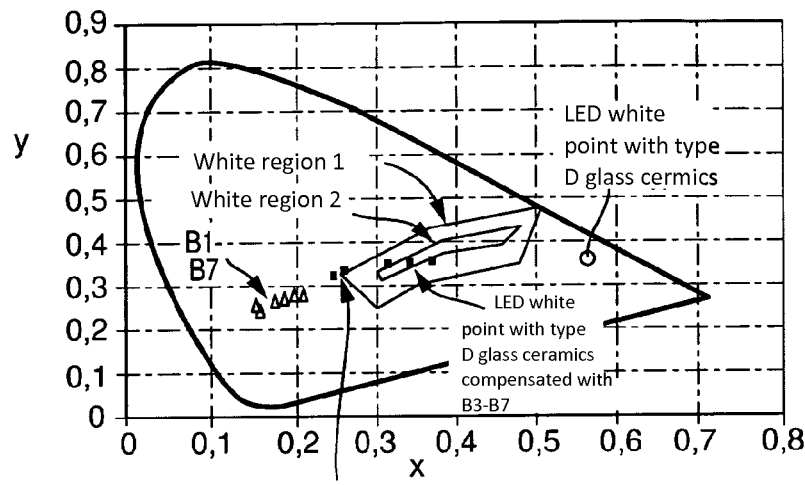
FIG. 3 illustrates the color coordinates of the standard light E, taken individually through type D glass ceramics and individually through different color filters B1-B7.

The color coordinates of the light-emitting element through the successively disposed filters no longer necessarily lie on a straight line between the color coordinates of the light-emitting element through the individual filters. Conversely, this leads to the phenomenon that the same common color coordinates, which are compensated according to the invention for a light-emitting element through glass ceramics, can be achieved with different compensation filters, whereby the color coordinates of the light-emitting element through the individual compensation filters need not be identical and depend on the spectral distribution in each case. In FIG. 3, the color coordinates of the standard light E, taken individually through type D glass ceramics and individually through different color filters B1-B7, which are disposed behind one another, each time in combination with the glass ceramics, can cause the standard light to appear at the same overall color coordinates. In the example shown, the color filters are constructed so that the overall color coordinates for the observer lie at the achromatic point E (gray or white point E).

With a compensation filter according to the invention, as described, it is thus possible to further compensate for the shift of the original color coordinates of the lighting means through the colored substrate, especially for white color coordinates. A further application according to the invention is to shift the color coordinates of the lighting means on the display side of the substrate to desired color coordinates that are different than the original color coordinates of the lighting means. The combined shift of the color coordinates through the substrate and the filter is not compensated here intentionally. In this case, on the one hand, one can produce color coordinates that cannot be shown, for example, by available fixed wavelengths of commercially available LEDs, for example, color coordinates that lie between those of a yellow LED and those of an orange LED. This is advantageous, e.g., for identifying, differentiating, and marketing of product lines. On the other hand, light-emitting elements can be constructed uniformly and thus with cost advantages using a variety of non-monochromatic, but spectrally widely emitting, colored lighting means (for example, white LEDs, fluorescent tubes). By application of different color filters according to the invention, different color coordinates can be produced for different product lines or the same color coordinates of a product line combined with differently colored substrates. Shifts of color coordinates and compensation are particularly applicable to spectrally broadband lighting means, such as white LEDs, fluorescent tubes, or mixed colors of combined single-color LEDs, for example RGB LEDs. Single-color, nearly monochromatic lighting means, for example, such as red, blue, and green LEDs used as single colors generally do not undergo notable shifts of color coordinates through filters.

According to the invention, to compensate the color coordinates of a lighting means so as to provide white does not mean to precisely hit upon the achromatic point E. Instead, the eye tolerates a wide range of color coordinates perceived as white. Among other things, this also depends on the color coordinates of the surrounding surfaces, such as a red-black cooktop surface. Preferably, it can thus be provided, for white compensation of any desired light-emitting element, to obtain color coordinates that preferably lie in the boundaries of the white region W1, and preferably of the white region W2. The white region W2 in this case encompasses the white fields defined in ANSI (ANSI binning) 1A, ..., 1D, ..., 8D, that are typically used by LED manufacturers in order to characterize the color coordinates of their white LEDs. This region corresponds to color temperatures of 2580 K to 7040 K (CCT, color correlated temperature), corresponding to a perceived white from warm white to cold white. The corner points of the white regions W1 and W2 in FIG. 3, which are defined according to the invention, are listed in Table 1. Of course, a white compensation can also be undertaken in a region outside the $W_1$ or $W_2$ regions. For example, a white compensation can also be undertaken up to 15,000 K (CCT, color correlated temperature) within the scope of the invention. The "cold white" region (between 10,000 K and 15,000 K) is perceived, of course, sometimes as "hard" by the user, partially from the light effect. Color temperatures down to 2000 K are conceivable; such light effects are perceived as having a yellow tinge.

According to the invention, the compensation of color coordinates is not limited to the example coatings 1-4 or the standard light source E. Preferably, commercially available and cost-effective lighting means, for example, white LEDs are used in an application. Lighting means of other colors, but not monochromatic, such as fluorescent tubes, for example, or, in addition, a combination, for example, of blue, green and red LEDs (RGB lighting means), which are adjusted to fixed color coordinates as backlighting of LCD displays, for example, or control a color representation of the display, can be employed in order to compensate the original color coordinates of the lighting means by means of appropriately constructed compensation filters on the display side of the cooktop or to specially produce a white color effect or also any other desired color effect.

According to the invention, the compensation of color coordinates is not limited to white color coordinates. Any desired color coordinates can be set with an appropriate compensation filter, for example, brand-specific colors for displays or company logos, or also different color coordinates for user-friendly differentiation of warnings, instructions or user assistance, or different color coordinates for different power levels in cooktops. This can find application in diverse examples, which provide an easier user management, status displays or different ambiences of decorative lighting.

Multicolor prints for generating multicolor lighting presentations or colored symbol representations are also conceivable.

Due to different coating methods, such as, e.g., screen printing, the color layer permits a sharp demarcation of the signal field and the screening out of scattered light, as well as a representation of signs, symbols or lettering, which are visible to the user when the illumination is turned ON and which is not perceptible to the user in the OFF status. Even the position of these markings/logos are not recognizable to the user in the OFF status, whereby the single-color elegant appearance of the glass-ceramic surface remains. This effect is designated the "dead front" effect and is often desired by designers, since the cooktop is clearly upgraded in total esthetics in this way. This "dead-front" effect is possible only with considerable additional expenditure, for example, in the case of transparent glass-ceramic cooktops known particularly in Japan. Based on the high transparency of these cooking surfaces, display indicators or lamps are visible directly or clearly, which is perceived partially as a disturbing effect. In contrast to these transparent cooking surfaces, the darkly colored cooking surfaces, in addition, can also be combined with powerful radiant heating units, whereupon with the proposed method, the glass-ceramic cooktops having radiant heating units or halogen heating units will be clearly upgraded in the user's experience.

It can be particularly provided within the scope of the invention that the color layer is applied as a color film or paint application, particularly onto a transparent support; in particular, it is introduced onto a film or foil support, and/or is coated onto the glass ceramics, and/or the color layer is held between two transparent supports, in particular two film supports, and/or the color layer is formed from a support colored throughout its thickness, at least in regions, in particular a film or foil support. The transparent support or the support colored throughout, for example, can be composed of a film or foil material. With application in combination with glass ceramics as cooking surfaces, film materials of polyethylene (PE), polycarbonate (PC) or of polyethylene terephthalate (PET) are particularly suitable. These materials are sufficiently temperature-resistant. The use of a film or foil material has the advantage that these materials are inexpensively obtainable and, in addition, make possible a uniform planar background of the glass ceramics. The use of a separate support makes possible a very uniform characteristic for the compensation filter.

Thin glass sheets are also particularly suitable.

Image sharpness of fine lines and lettering on the top surface is possible without optically disruptive distortions when glass-ceramic cooktops that are usually knobby or dimpled on the bottom are used, by applying a leveling layer, which is matched in its refractive index, on the dimpled surface. This is a further clear advantage when compared to the masking printed onto a dimpled bottom as described in U.S. Pat. No. 6,369,365. Distortions that are too greatly disruptive arise due to the direct printing of the dimpled bottom, so that only very large, coarse windows and symbols can be represented. The thickness of the cooktop usually amounts to 4 mm, but it also amounts to up to 6 mm in commercial applications. In order to increase the color intensity or brightness, it is also conceivable to use cooktops with a reduced thickness of 3 mm, for example.

In addition to the principal application field indicated here for lighting with individual LEDs or 7-segment displays, this system is also suitable, of course, for any other desired light source and form of presentation; for example, halogen lamps, light sticks, fiber optics or fluorescent tubes can be used also as a light source. In addition to light points or 7-segment displays, bar graphs or illuminated labels for identifying cooking zones or marking are also conceivable, as is also the illumination of larger cooking zone surfaces or borders. In addition, compensation of color coordinates or shifts according to the invention are also applicable to background lighting of alphanumeric or graphic displays, for example LCD displays. In addition to the preferred use in glass-ceramic cooktops, this system can also be used in the panel region of baking ovens or Domino cooking appliances, including grilling plates. For example, fireplace surrounds of glass ceramics are also known. An illumination with the proposed system for improvement of user comfort is also possible for these fireplace surrounds. The cooktop can be shaped as planar, curved, or it may have a complex shape. Gas burners, induction coils or radiant heating units or halogen heating units are conceivable as heating for the cooking areas.

A corresponding transmission curve that results from the transmission curves of the substrate and of the color filter (color layer) is a deciding factor for the overall perception of the desired color. Since the transmission curve of the substrate is "predefined", the correction can only be effected via the color layer.

The correction filter effect of the color layers is determined by the respective transmission curve in the visible region via the following essential parameters:

Position of the transmission maximum
Width of the transmission maximum
Intensity of the transmission maximum The position and width of the transmission maximum is determined by the color composition, in particular by the color pigments. The intensity, in contrast, is determined by the layer thickness of the color and the concentration of the colorant or of the color pigment in the color matrix.

Figure 4:
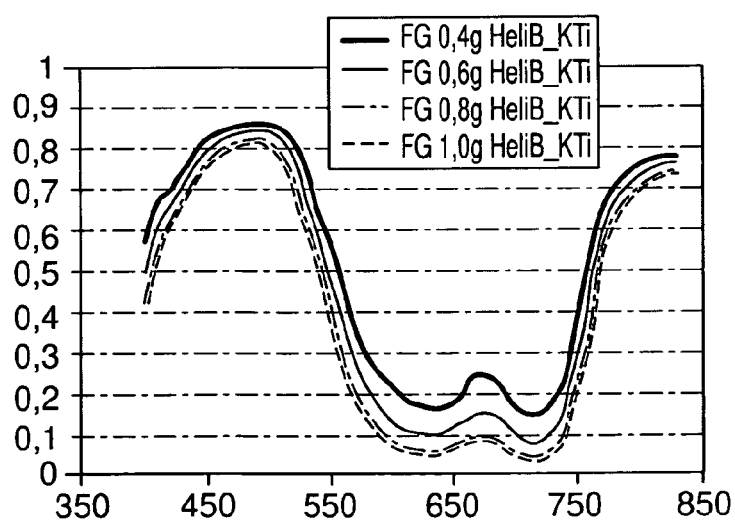
FIG. 4 illustrates different colorant concentrations are shown as a function of the transmission.
Figure 5:
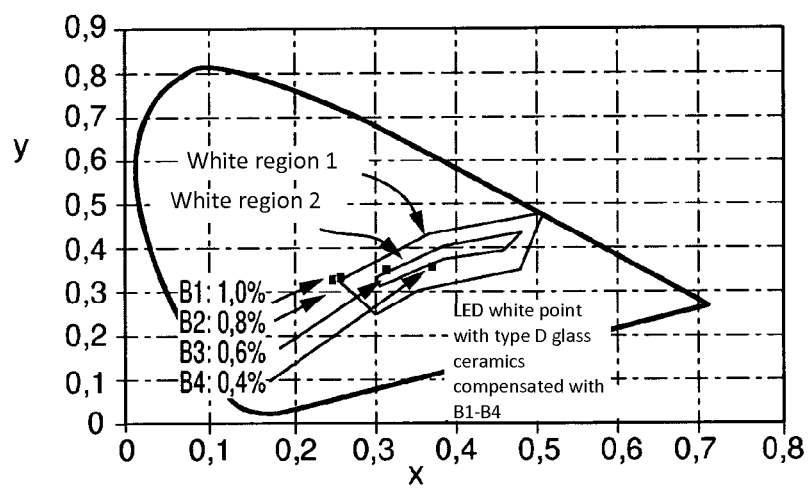
FIG. 5 illustrates different colorant concentrations are shown as a function of the color coordinates.

Thus, different colorant concentrations are shown in FIG. 4 and FIG. 5 as a function of the transmission (FIG. 4) and of the color coordinates (FIG. 5), wherein the spectra B1 to B4 are optimized for the compensation of the standard light source E for the glass-ceramic type D are shown in FIG. 4, and the concentration curves B1 to B4 are shown in FIG. 5. By means of a targeted selection of the colorant and/or pigment concentration, the color coordinates can be adjusted to the desired range.

The color layer containing 1% and 0.8% Heliogen blue (B1 or B2) lies at the edge of the white region W1. In contrast, B3 containing 0.6% Heliogen blue component in the color matrix lies at the upper end of the white region W2, and B4 containing 0.4% of the same blue colorant lies below W1. Due to the position of the points B1-B4 in the graph of the color coordinates (FIG. 5), it is shown that the desired color coordinates are possible due to a targeted adjustment of the pigment concentration. The colorant or pigment concentration in the finished baked color layer can be adapted to the respective substrate by means of the layer thickness and/or by the colorant and/or pigment concentration in the color matrix.

The color layer can be produced from different color systems. On the one hand, organic color systems, e.g., for low-temperature applications, and on the other hand, inorganic color systems for high-temperature applications, or mixtures of the same are suitable.

As stated above, the adapted transmission curve can be obtained by color layers that are composed of a color matrix and/or colorants and/or color pigments. As colorants/color pigments, organic and inorganic colorants and/or color pigments are used, preferably absorbing organic and inorganic colorants/color pigments; particularly preferred are blue, green and blue-green colorants/color pigments. Of the blue-green colorants/color pigments, those colorants/color pigments are preferred that have a transmission maximum in the region of 400-600 nm, and particularly preferred in the region of 450-550 nm. For example, iron-cyano complexes, indanthrone, indigo, copper phthalocyanines, preferably the β-form of copper phthalocyanines, chromium chelates, preferably $Cr^{3+}$ with ligands of the azo and azomethine series, e.g., Heliogen blue 23050, are used as colorants.

Used as color pigments are, for example, cobalt-tin oxide compounds (mixed oxides); aluminum silicates, preferably sulfur-containing aluminum silicates (e.g., ultramarine blue and green); zirconium silicates, preferably with vanadium additive, particularly preferably with 1.5% vanadium additive; zirconium silicate-vanadium oxides; calcium-copper silicates, preferably $CaCuSi_4O_{10}$; copper carbonate compounds, $2CuCO_3*Cu(OH)_2$; cobalt-aluminum-oxide compounds, preferably as cobalt aluminate (cobalt aluminum spinel; Color Index Blue 28); and cobalt-chromium oxide compounds, preferably as cobalt chromite (cobalt-chromium spinel; Color Index Blue 36).

These pigments are preferably used as nanoparticles. As a special embodiment, the named pigments can also be applied as scattered particles.

The color matrix may be composed of organic and/or inorganic components, where the inorganic matrix is preferably employed, in particular, for applications in the higher temperature region. An inorganic color matrix is generally composed of a glass powder and a medium with which the processability/printability, etc. can be adjusted. The organic color matrix is composed of a binder, solvent, and additives such as curing agents, cross-linkers, flow-control agents, additives, anti-foaming agents, acidic and/or basic and/or cationic and/or anionic and/or radical polymerization initiators.

The following can be used as binders: acrylate-based, siloxane-based, silazane-based systems, preferably rubber, polyurethane resins, silicone (organic and/or inorganic, cross-linking), sol-gel compounds, hybrid polymers, acrylate-based systems, preferably methacrylates, epoxides, polyamides, polyimide and mixtures of the same. These binders can be used with and without nanoparticles.

In particular, the coating composition can comprise sol-gel precursors of silicon, titanium, zirconium, aluminum, zinc, magnesium, calcium, tin or mixtures thereof. Most particularly preferred are the sol-gel precursors $SiOR_xR_y$, $TiOR_xX_y$, $ZrOR_xX_y$, $AlOR_xX_y$, $ZnOR_xX_y$, $MgOR_xX_y$, $CaOR_xX_y$ and $SnOR_xX_y$.

In one embodiment, the particle size of the sol-gel precursors and/or the organometallic and/or inorganic nanoparticles is in a range of 0.05 to 200 nm, particularly preferred from 1 to 100 nm. The particle shape in this case can particularly be spherical as well as irregular, or also a chain can be formed.

In a particularly preferred embodiment, the coating composition comprises a UV-curable and/or thermally curable hybrid-polymeric, hydrolyzed and condensed alkoxysilane precursor, in particular, glycidyloxypropyltriethoxysilane and/or methacryloxypropyltrimethoxysilane, which can be further functionalized with polysiloxanes. Preferably, methyl and/or phenyl-functionalized polysiloxanes are used. The sol-gel layer on the glass ceramics thus preferably comprises the reaction products of the sol-gel precursors described herein with the polysiloxanes described herein.

In a special embodiment according to the invention, the coating contains inorganic nanoparticles. The nanoparticles improve the scratch resistance of the coating, for example. In this particular embodiment, inorganic nanoparticles are added to the coating solution. Preferably, the volume fraction of the nanoparticles in the coating composition amounts to more than 10% and, more preferably, to more than 20%. The nanoparticles are preferably added as an alcoholic dispersion.

Preferably, the coating composition also comprises nanoparticles in the form of amorphous or nanocrystalline metal oxides. Preferred metal oxides are silicon dioxide ($SiO_2$), titanium dioxide ($TiO_2$), zirconium dioxide ($ZrO_2$), $Y_2O_3$-stabilized zirconium oxide, alumina ($Al_2O_3$), zinc oxide (ZnO) and indium-tin oxide (ITO). Preferably, their hybrid polymeric derivatives or compounds may also be used. The metal oxides may be present in the form of particles and/or organometallic polymers.

For example, terpineol, n-butyl acetate, carbitol, carbitol acetate, ethylene glycol monoethyl ether and mixtures of the same are used as solvents. In particular, a color matrix suitable for screen printing requires high-boiling solvents with a vapor pressure of <5 hPa, preferably of <2 hPa, and most particularly preferred of <1 hPa. Additionally, curing agents can be added, e.g., in order to increase the layer hardness/scratch resistance, for example nanoparticles, bisepoxides. Depending on the coating method in each case, various flow-control agents may also be added, for example, PEG, BYK 302, BYK 306, in order to obtain homogeneous layer thicknesses. In particular, when printing on non-smooth surfaces, e.g., dimpled surfaces, a wetting agent/flow-control agent is added, which permits a reproduction of the dimpled structures.

The components of the color matrix and the colorants and/or color pigments are homogenized, preferably by means of a Dispermat (Ultra-Turax) or three-roll mill.

Different coating methods are applied: for example, printing methods, such as ink-jet printing, offset printing, pad printing, roll coating, preferably screen printing; dipping methods, spin coating, spraying methods. The viscosity of the color matrix must be adapted to the processability/printability for these coating methods; in particular, the thixotropic behavior must be adapted to the preferred screen printing method. Among others, cellulose compounds, polyvinylpyrrolidone, polyethylene glycol, block copolymers are used as organic thickeners; aerosils, flame-pyrolysis-produced or precipitation-produced $SiO_x$ or $Al_xO_y$ particles are used as inorganic thickeners.

After coating, the color layers, for example, are thermally cured and/or UV-cured; in the case of inorganic paints (ceramic paint), the color layer is baked at temperatures of over 500° C., preferably >700° C.

The filtering effect of the color layers according to the invention requires homogeneous layer thicknesses, so that the fluctuations in layer thickness are <3 μm, preferably <1 μm, and most particularly preferred <0.5 μm. Therefore, smooth surfaces are preferred on both sides. In this context, "smooth" means that the top and the bottom surfaces have approximately the same surface geometry and the bottom does not have the usual dimpled structure.

In particular, in the case of non-smooth surfaces, e.g., knobby or dimpled surfaces, a leveling layer, which is preferably matched in refractive index, can be applied directly onto the surface, this layer being composed of, for example, polyurethane resins, silicone (organic and/or inorganic, crosslinking), sol-gel compounds, hybrid polymers, acrylate-based systems, preferably methacrylates, epoxides, polyamides, polyimide, and mixtures of the same. This leveling layer can be used with and without nanoparticles. Then the already described color layer will be introduced on this leveling layer.

According to another embodiment of the invention, it can be provided that the leveling layer joins the color layer with the glass ceramics indirectly or directly, in particular bonds it, or that the leveling layer binds a support having the color layer to the glass ceramics.

Embodiment Example 1: Dark Glass Ceramics with Smooth Bottom

Production Binder A 0.08 mole of GPTES (glycidyloxypropyltriethoxysilane) containing 0.02 mole of TEOS (tetraethoxysilane) is hydrolyzed with water mixed with 0.125 mole of para-toluic acid. Then the solvent is removed in a rotary evaporator and 22.6 g of binder are obtained.

Production Binder B 0.04 mole of MPTMS (methacryloxypropyltrimethoxysilane) containing 0.02 mole of TEOS (tetraethoxysilane) and 0.04 mole of MTEOS (methyltriethoxysilane) is hydrolyzed with water mixed with 0.125 mole of para-toluic acid. Then the solvent is removed in a rotary evaporator.

A commercially available dispersion of 15-nm $SiO_2$ particles in diethylene glycol monopropyl ether is used as a nanoparticle-containing solution.

The initiator solution contains 50 mass % of heat-activatable initiator methylimidazole in ethylene glycol monopropyl ether.

A color which was composed of the following components was printed by screen printing onto the bottom of a dark glass-ceramic product that was smooth on both sides and was manufactured from a glass-ceramic material corresponding to glass ceramics of the type CERAN HIGHTRANS Eco® and which has a thickness of 4 mm:

30 mass % binder A
65 mass % nanoparticle-containing sol-gel solution
2 mass % initiator solution
3 mass % Heliogen blue 23050

This color was printed with two different screen-fabric thicknesses and then dried for 3 min with UV-illumination from a Dymax 500 apparatus. With a screen-fabric thickness of 100-40, the layer thickness was 4.9 μm, the layer was cracked, and the overall color effect by illumination with a white LED was bluish. With a screen thickness of 140-31, in contrast, a layer thickness of 2.8 μm was obtained, which had a closed, homogeneous surface structure. This time, with the same backlighting, an overall white color effect was obtained.

Embodiment Example 2: Dark Glass Ceramics with Dimpled or Knobby Bottom

A leveling layer of polyurethane resin was printed by screen printing on a dimpled dark glass-ceramic product of the type CERAN HIGHTRANS Eco® and then thermally cured. The fluctuation in layer thickness was <3 μm. A color was printed on this leveling layer by means of a screen-printing method, this color being composed of the following components:
32% binder A
60% nanoparticle-containing sol-gel solution
2% initiator solution
6% Blue 807 dye 94030
Drying was conducted for 3 min under UV radiation.
The fluctuation in layer thickness was <3 μm; the light of a white LED was shown to be homogeneously white.

Embodiment Example 3: Dark Glass Ceramics with Dimpled or Knobby Bottom

A leveling layer of polyurethane resin was printed by screen printing on a dimpled dark glass-ceramic product of the type CERAN HIGHTRANS Eco® and then thermally cured. The fluctuation in layer thickness was <3 μm. A color was printed on this leveling layer by means of a screen-printing method, this color being composed of the following components:
32% binder B
60% nanoparticle-containing sol-gel solution
2% initiator solution
6% Blue 807 dye 94030
Drying was conducted for 60 min under IR radiation combined with convection.
The fluctuation in layer thickness was <3 μm; the light of a white LED was shown to be homogeneously white.

Embodiment Example 4: Dark Glass Ceramics with Ceramic Color Layer

A ceramic color was printed by screen printing onto a 4-mm thick glass-ceramic product which was smooth on both sides (corresponding to a material such as CERAN HIGHTRANS Eco®). The color was composed of a borosilicate glass powder (40%), a screen-printing medium (50%) and blue pigment (10%) of the CI class 36 (cobalt-aluminum oxide), which was homogenized in a three-roll mill.

This color was baked in at temperatures >500° in the oven.

The layer thickness amounted to 4 μm, the fluctuation of the layer thickness being <1 μm. The color effect with a white LED backlighting was white with a slight reddish tinge.

The invention will be explained in further detail in the following on the basis of examples of embodiment shown in the drawings according to FIGS. 6 to 9. These drawings show the schematic structure of different display devices in lateral view.

Figure 6:
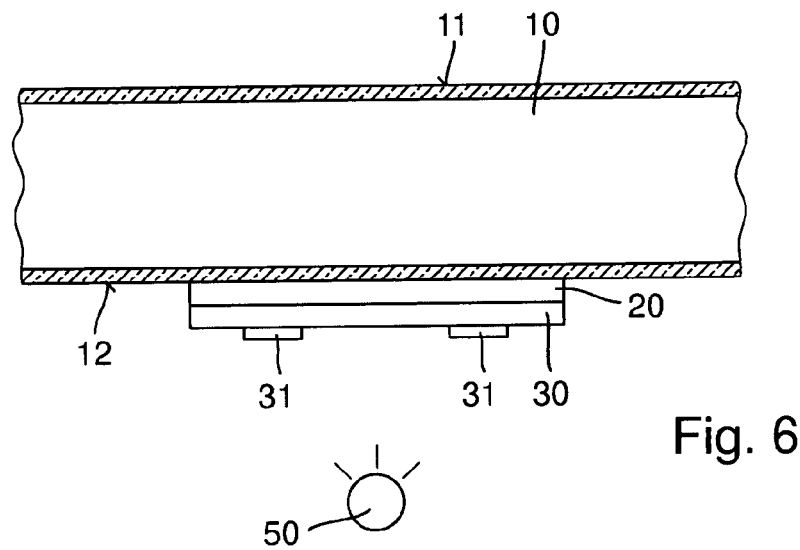
FIG. 6 illustrates a glass ceramic product.

FIG. 6 shows a glass ceramic product 10, which has a smooth top side as display face 11 and a smooth bottom as illumination face 12. Therefore, the end surfaces forming the display face 11 and the illumination face 12 of the glass ceramics 10 are disposed in a plane-parallel manner to one another. A color compensation filter 20 in the form of a color layer is applied on the glass ceramics 10 in the region of the bottom of the illumination face. It is conceivable here that the color layer is introduced by means of a screen-printing method or similar printing method. In addition, it is conceivable that the application of the color is introduced alternatively on a separate support, and this separate support is placed on the illumination face 12 of the glass ceramics 10. The color compensation filter 20 is held in place by means of a backing 30. The latter can be formed, for example, as a transparent surface material, for example as a film or foil or a panel made of glass or plastic. Layer elements 31 are introduced onto the side of the support 30 that is facing away from the color compensation filter 20. These can be formed as maskings, grids, operating symbols or the like. They can be printed on or, for example, they can be introduced as a separate element, in particular as a foil or film. It is also conceivable that the layer elements 31 are applied by laser, etched, sprayed on or applied by sputtering. A light-emitting element 50 is disposed in the region behind the color compensation filter 20. The light emitted by the light-emitting element 50 passes through the support 30, the color compensation filter 20 and the glass ceramics 10 on the display face 11. In the passage of light, due to the color compensation filter 20 and the colored glass ceramics 10, the light of the light-emitting element 50 is filtered in such a way that the desired light effect arises on the display face 11. It can also be additionally provided that the support 30 is partially transparent and also acts as a filter element so as to influence the passage of light. The layer elements 31 can be designed as impermeable to light, for example. In this way, light cannot pass through the glass ceramics 10 at this site, so that an appropriately darker optical impression is achieved on the display face 11. For example, symbols, display elements or the like can be simply represented in this way.

Figure 7:
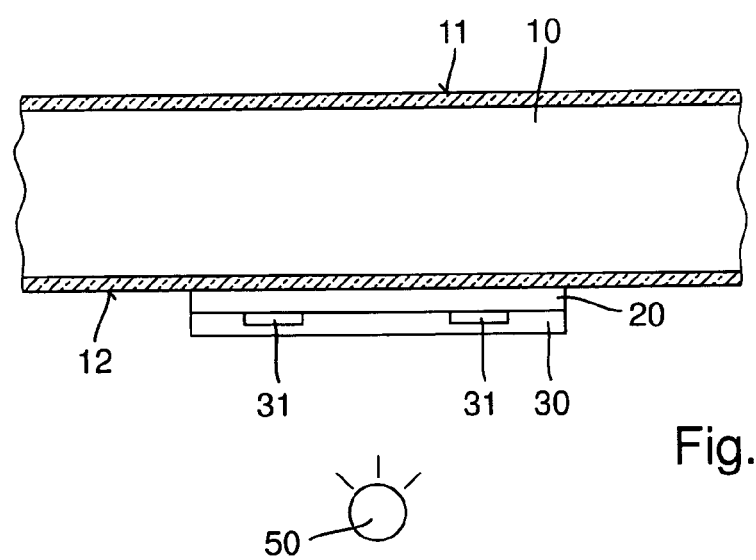
FIG. 7 illustrates a variant of the glass ceramic product of FIG. 6.

The embodiment variant according to FIG. 7 essentially corresponds to that according to FIG. 6. Unlike FIG. 6, of course, the layer elements 31 are moved to the region between the support 30 and the color compensation filter 20. In this way, they are protected from mechanical stress.

Figure 8:
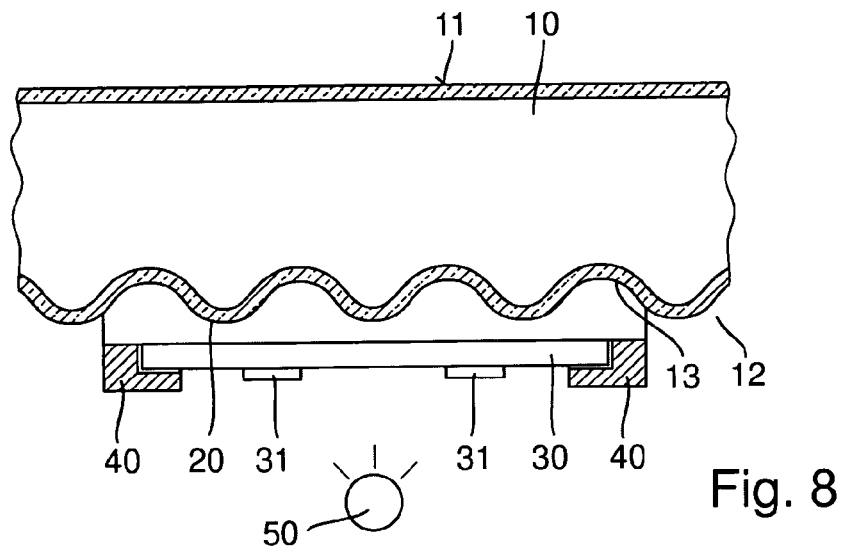
FIG. 8 illustrates another glass ceramic product.

FIG. 8 shows a glass-ceramic product 10, which has a smooth top side as display face 11 and an illumination face 12 on the back. The illumination face 12 is designed as structured. Therefore, it has a structuring 13, which is formed by knobby raised structures. This type of configuration of glass-ceramic cooktops is generally common. A color compensation filter 20 is further introduced in the form of a color layer in the region of the illumination face 12. In this case, the coating method is selected so that a plane surface is formed on the side facing away from the glass ceramics 10. Thus the color layer equilibrates the unevenness of the glass ceramics 10 formed by the structuring 13. The color compensation filter 20 serves as the support with strip-shaped retaining elements 40 or retaining elements in frame shape. These elements are fastened to, for example, glued to the color compensation filter 20. The retaining elements 40 form guides in which the flat support 30 can be moved on the front side. Analogously to the embodiment examples according to FIGS. 6 and 7, the support 30 has layer elements 31. With the embodiment of a display device shown in FIG. 8, it is possible to replace the support 30, for example, to make possible a customization of the display device.

Figure 9:
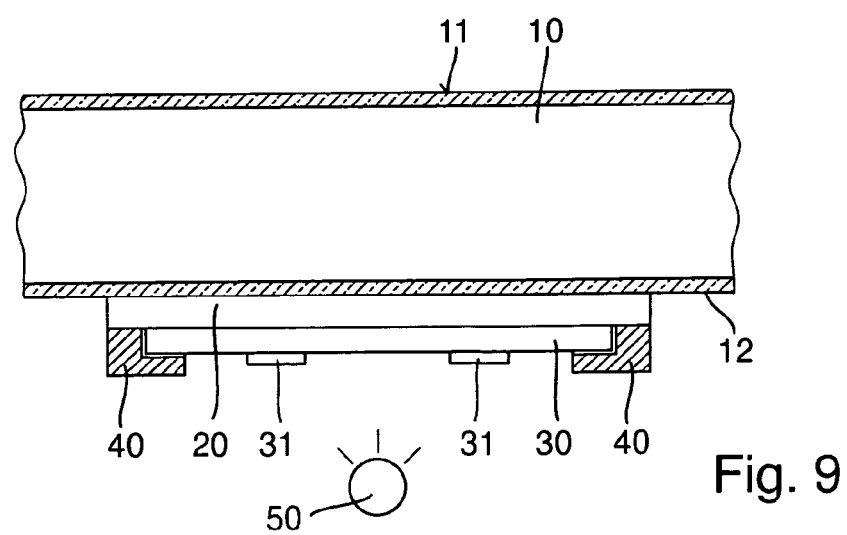
FIG. 9 illustrates a variant of the glass ceramic product of FIG. 8.

The example of embodiment according to FIG. 9 essentially corresponds to the embodiment example according to FIG. 8, with the difference that a glass-ceramic product 10 with structuring 13 is not used, but rather a glass-ceramic product 10 that is smooth on both sides.

A further customization of function can be achieved with the retaining elements 40, in that they serve for the coupling of electrical components, such as, for example, the light-emitting element 50, printed circuit boards, sensors, switches, or the like.

In addition, it can be provided that the support 30 and/or the color compensation filter 20 is (are) equipped with electrically conductive traces. The electrically conductive traces can be used for the control and/or evaluation of electrical, electromagnetic, capacitive, inductive, or optical signals. For example, the conductive traces can be used for coupling touch sensors, touch panels, electrodes, motion sensors, pot sensors, liquid sensors, antennas, monitors, displays, or the like. The conductive traces can thus be designed, for example, so that they form a fine structure that is invisible or barely visible to the naked eye, or form a partially transparent metal surface in the visible wavelength region. It is also conceivable that the support 30 is designed in such a way that it forms a light-scattering disk. In this way, floodlights can be simply produced.

The invention claimed is:

1. A display device comprising:
   a transparent, colored glass-ceramic cooktop having a display face on a front and an illumination face on a back;
   at least one light-emitting element disposed in a region of the illumination face; and
   a color compensation filter in the form of a color layer directly or indirectly on the illumination face of the glass-ceramic cooktop, wherein the color compensation filter is arranged between the front and the light emitting element so that the glass ceramic and the color compensation filter form two filters arranged one after another with a shift in a chromaticity coordinate x, y in the CIE Norm Valent System CIExyY (CIE: Commision Internationale de l'Eclaireage, 1931, 2° observer) of the light emitting element due to the glass ceramic being corrected by the color compensation filter to yield a desired standardized chromaticity coordinate x, y in the CIE Norm Valent System CIExyY (CIE: Commision Internationale de l'Eclaireage, 1931, 2° observer),
   wherein the glass-ceramic cooktop has an average transmission of greater than 0.2% for each of the spectral regions of 420 nm to 500 nm, 500 nm to 620 nm, and 550 nm to 640 nm, and
   wherein the glass-ceramic cooktop has a maximum transmission of less than 40% at 400 nm and 700 nm and an average transmission of less than 4% between 450 nm and 600 nm.

2. The display device according to claim 1, wherein the color layer is disposed directly on the illumination face.

3. The display device according to claim 1, wherein the color layer comprises a colorant selected from the group consisting of organic colorants, inorganic colorants, color pigments, and combinations thereof.

4. The display device according to claim 3, wherein the colorant has a concentration between 4 and 0.1 wt. %.

5. The display device according to claim 3, wherein the colorant has a concentration between 2 and 0.4 wt. %.

6. The display device according to claim 1, wherein the color layer comprises color pigments comprising a transmission maximum in a region of 400 nm to 600 nm.

7. The display device according to claim 6, wherein the color layer comprises color pigments comprising a transmission maximum in a region of 450 nm to 550 nm.

8. The display device according to claim 1, wherein the color layer comprises a colorant selected from the group consisting of iron-cyano complexes, indanthrone, indigo, copper phthalocyanin, chromium chelate, aluminum silicates, zirconium silicates, zirconium silicate-vanadium oxide compounds, calcium-copper silicates, copper carbonate compounds $2CuCo_3*Cu(OH)_2$, cobalt-aluminum oxide compounds, cobalt-chromium oxide compounds, and combinations thereof.

9. The display device according to claim 8, wherein the colorants have a transmission maximum in a region of 400 nm to 600 nm.

10. The display device according to claim 1, wherein the color layer comprises the color pigments formed of nanoparticles.

11. The display device according to claim 1, wherein the color layer comprises the color pigments applied as particles scattered on the color layer.

12. The display device according to claim 1, wherein the color layer has a color matrix of components selected from the group consisting of organic components, inorganic components, and combinations thereof.

13. The display device according to claim 1, wherein the color layer comprises an inorganic color matrix of glass powder.

14. The display device according to claim 1, wherein the color layer comprises an organic color matrix comprising a binder, a solvent, and one or more additives selected from the group consisting of curing agents, flow-control agents, and additives.

15. The display device according to claim 14, wherein the binder comprises a material selected from the group consisting of an acrylate-based system, a siloxane-based system, a silazane-based system, rubber, a polyurethane resin, an organic cross-linking silicone, an inorganic cross-linking silicone, a sol-gel compound, a hybrid polymer, an acrylate-based system, methacrylate, epoxide, polyamide, polyimide, and combinations thereof.

16. The display device according to claim 14, wherein the solvent is selected from the group consisting of terpineol, n-butyl acetate, carbitol, carbitol acetate, ethylene, and glycol monoethyl ether.

17. The display device according to claim 14, wherein the solvent is a high-boiling solvent with a vapor pressure of less than 5 hPa.

18. The display device according to claim 14, wherein the color layer comprises a curing agent selected from the group consisting of nanoparticles, bisepoxides, and combinations thereof.

19. The display device according to claim 14, wherein the color layer comprises a leveling agent selected from the group consisting of PEG, BYK302, BYK306, and combinations thereof.

20. The display device according to claim 14, wherein the additives comprise organic thickeners selected from the group consisting of cellulose compounds, polyvinylpyrrolidone, polyethylene glycol, block copolymers, aerosils, flame-pyrolysis-produced $SiO_x$ particles, flame-pyrolysis-produced $Al_xO_y$ particles, precipitation process-produced $SiO_x$ particles, precipitation process-produced $Al_xO_y$ particles, and combinations thereof.

21. The display device according to claim 1, wherein the color layer is baked into a surface of the glass-ceramic cooktop and is cured.

22. The display device according to claim 1, wherein the color layer has a layer thickness that fluctuates less than 3 μm.

23. The display device according to claim 1, further comprising a leveling layer disposed between the glass-ceramic cooktop and the color layer.

24. The display device according to claim 23, wherein the leveling layer binds a support having the color layer to the glass-ceramic cooktop.

25. The display device according to claim 23, wherein the leveling layer has a refractive index, when compared with a refractive index of the glass-ceramic cooktop, deviates by a maximum of 20%.

26. The display device according to claim 23, wherein the leveling layer comprises a material selected from the group consisting of polyurethane resin, an organic crosslinking silicone, an inorganic crosslinking silicone, a sol-gel compound, a hybrid polymer, an acrylate-based system, a methacrylate, an epoxide, a polyamide, a polyimide, and combinations thereof.

27. The display device according to claim 1, further comprising color coordinates of standard illumination through the glass-ceramic cooktop are disposed within a boundary curve that is defined by the following corner coordinates in the CIExyY-2° chromaticity diagram:

| Boundary curve G1 | |
| --- | --- |
| x | Y |
| 0.71 | 0.27 |
| 0.17 | 0.02 |
| 0.12 | 0.08 |
| 0.05 | 0.30 |
| 0.01 | 0.60 |
| 0.08 | 0.81 |
| 0.28 | 0.70 |
| 0.71 | 0.27. |

28. The display device according to claim 27, wherein the color coordinates of standard illumination through the glass-ceramic cooktop are further disposed within a boundary curve that is defined by the following corner coordinates in the CIExyY-2° chromaticity diagram:

| Boundary curve G2 | |
| --- | --- |
| x | Y |
| 0.64 | 0.28 |
| 0.20 | 0.07 |
| 0.17 | 0.09 |
| 0.10 | 0.30 |
| 0.08 | 0.56 |
| 0.12 | 0.70 |
| 0.26 | 0.65 |
| 0.64 | 0.28. |

29. The display device according to claim 1, wherein the glass-ceramic cooktop has a thickness between the display face and the illumination face that ranges between 2 and 6 mm.

30. The display device according to claim 1, wherein the color layer has a layer thickness between 30 and 1 μm.

31. The display device according to claim 1, wherein the color layer comprises color pigments with a concentration that ranges between 40 and 1 wt. %.

32. The display device according to claim 1, wherein the concentration that ranges between 10 and 5 wt. %.

33. The display device according to claim 1, wherein the color layer comprises a nanoparticle selected from the group consisting of silicon dioxide, titanium dioxide, zirconium dioxide, yttrium oxide-stabilized zirconium oxide, alumina, zinc oxide, and indium-tin oxide.

34. The display device according to claim 1, wherein the color layer comprises a sol-gel precursor selected from the group consisting of silicon, titanium, zirconium, aluminum, zinc, magnesium, calcium, tin, and mixtures thereof.

35. The display device according to claim 1, wherein the color layer comprises a sol-gel precursor selected from the group consisting of SiORxRy, TiORxXy, ZrORxXy, AlORxXy, ZnORxXy, MgORxXy, CaORxXy and SnORxXy, and mixtures thereof.

36. A display device comprising:
a transparent, colored glass-ceramic cooktop having a display face on a front and an illumination face on a back;
at least one light-emitting element disposed in a region of the illumination face;
a color compensation filter in the form of a color layer directly or indirectly on the illumination face of the glass-ceramic cooktop, wherein the color compensation filter is arranged between the front and the light emitting element so that the glass ceramic and the color compensation filter form two filters arranged one after another with a shift in a chromaticity coordinate x, y in the CIE Norm Valent System CIExyY (CIE: Commision Internationale de l'Eclaireage, 1931, 2° observer) of the light emitting element due to the glass ceramic being corrected by the color compensation filter to yield a desired standardized chromaticity coordinate x, y in the CIE Norm Valent System CIExyY (CIE: Commision Internationale de l'Eclaireage, 1931, 2° observer); and
a backing support that holds the color compensation filter in place directly or indirectly on the illumination face,
wherein the glass-ceramic cooktop has an average transmission of greater than 0.2% for each of the spectral regions of 420 nm to 500 nm, 500 nm to 620 nm, and 550 nm to 640 nm, and
wherein the glass ceramic cooktop has a maximum transmission of less than 40% at 400 nm and 700 nm and an average transmission of less than 4% between 450 nm and 600 nm.

37. The display device according to claim 36, further comprising layer elements disposed on the backing support, the layer elements being impermeable to light so that a dark optical impression is achieved on the display face.

38. The display device according to claim 37, wherein the layer elements are disposed on a side of the backing support facing away from the color compensation filter.

39. The display device according to claim 37, wherein the layer elements are disposed on a side of the backing support facing the color compensation filter so that the layer elements are between the backing support and the color compensation filter.

40. The display device according to claim 37, further comprising retaining elements fastened to the color compensation filter, the retaining elements forming guides that retain the backing support so as to hold the color compensation filter directly or indirectly on the illumination face.

41. The display device according to claim 40, wherein the layer elements are disposed on a side of the backing support facing away from the color compensation filter.

42. The display device according to claim 40, wherein the layer elements are disposed on a side of the backing support facing the color compensation filter so that the layer elements are between the backing support and the color compensation filter.

43. The display device according to claim 40, wherein the guides removably retain the backing support so that the backing support having the layer elements thereon are replaceable.

44. The display device according to claim 37, wherein the at least one light-emitting element is coupled to the retaining elements.

45. The display device according to claim 37, wherein the illumination face is smooth and the color compensation filter is held directly on the illumination face by the backing support.

46. The display device according to claim 37, wherein the illumination face is structured and the color compensation filter equilibrates unevenness formed by the structuring so that a plane surface is formed on a side facing away from the color compensation filter.

47. The display device according to claim 46, further comprising retaining elements fastened to the color compensation filter, the retaining elements forming guides that retain the backing support so as to hold the color compensation filter directly or indirectly on the illumination face.

48. The display device according to claim 36, wherein the backing support acts as a filter element.

* * * * *